United States Patent [19]
Weber

[11] Patent Number: 4,794,853
[45] Date of Patent: Jan. 3, 1989

[54] UNIVERSAL BREW BASKET SUPPORT ARMS

[75] Inventor: Robert L. Weber, New Canaan, Conn.

[73] Assignee: Grindmaster Corporation, Louisville, Ky.

[21] Appl. No.: 98,539

[22] Filed: Sep. 18, 1987

[51] Int. Cl.$^4$ .......................... A47J 31/02; A47J 31/06
[52] U.S. Cl. ......................................... 99/295; 210/480
[58] Field of Search ................. 99/295, 279, 306, 300, 99/304, 280, 281, 282, 283; 210/480, 481; 426/433

[56] References Cited
U.S. PATENT DOCUMENTS

| | | | |
|---|---|---|---|
| 3,793,935 | 2/1974 | Martin | 99/295 |
| 3,978,778 | 9/1976 | Roberts | 99/281 |
| 4,207,809 | 6/1980 | Brill | 99/279 |
| 4,280,401 | 7/1981 | Cleland | 99/295 |

OTHER PUBLICATIONS
Grindmaster Model GCG-100.
Grindmaster Model GCG-200.

Primary Examiner—Philip R. Coe
Assistant Examiner—Kim O'Leary
Attorney, Agent, or Firm—Maurice L. Miller, Jr.

[57] ABSTRACT

Support apparatus for coffee maker brew baskets comprises a base, an upstanding stop wall and a support plate spaced apart above the base. A coffee grinder discharge spout empties through the support plate. A pair of support arms are pivotally mounted extending horizontally subadjacent the support plate and flanking the coffee grinder discharge spout. The support arms each have a straight portion extending from the pivot point and a curved facing portion extending to a distal end on which an inwardly protruding nib is provided. The support arms are linked for co-pivoting separational movement and are spring biased together. Brew baskets inserted between the support arms are held under the discharge spout.

15 Claims, 3 Drawing Sheets

UNIVERSAL BREW BASKET SUPPORT ARMS

FIELD OF INVENTION

The invention herein relates to support arm apparatus for coffee maker brew baskets of various sizes, the support arm apparatus generally being used in conjunction with coffee bean grinder for holding the brew baskets to receive the ground coffee output.

BACKGROUND OF INVENTION

Restaurants and other food service establishments are increasingly relying on freshly ground coffee beans to achieve high quality brewed coffee. The restaurants are also making different amounts of coffee at different times, based on anticipated demand. Further, the restaurants are brewing various kinds of coffee, for example, decaffeinated coffee and expresso coffee in addition to regular coffee. As a result, the typical restaurant kitchen has several different coffee makers of varying brand and/or capacity. These coffee makers generally employ a brew basket which receives and holds ground coffee, with hot water being passed through the ground coffee beans to realize the brewed coffee.

The brew baskets are similar in principles of construction, namely, they comprise a generally cylindrical upper side wall, which may or may not taper inwardly toward the bottom of the brew basket, and have a radially outwardly extending flange or lip about the upper periphery of the side wall, the lip being used in supporting the brew baskets on their respective coffee makers. A handle is also typically provided for placing the brew basket in or out of its operative position. Although the brew baskets have the same general configuration, they have various diameters, often depending on the brand and/or capacity of the coffee maker.

A coffee grinder is used to process the coffee beans into ground coffee, and a restaurant generally has only one coffee grinder. It may be a free-standing coffee grinder having provision for loading coffee beans into a feed spout thereof, or the coffee grinder may be part of a coffee bean weighing and grinding apparatus such as is described in my co-pending patent application entitled COMBINED COFFEE WEIGHER AND GRINDER WITH SELECTABLE MEASURED QUANTITIES, Ser. No. 07/100039, filed on even date herewith. In either case, it will be appreciated that the process of brewing coffee can be made more convenient and expeditious by providing means for supporting any one of a variety of sizes of coffee brew baskets below the coffee grinder to receive the ground coffee output.

SUMMARY OF INVENTION

It is a principal object of the invention herein to provide apparatus for supporting brew baskets of a variety of sizes to receive the output of a coffee bean grinder.

It is an additional object of the invention herein to provide means for supporting brew baskets of a variety of sizes below a coffee bean grinder wherein the size adjustment is automatically achieved upon receiving a particular brew basket.

It is a further object of the invention herein to provide means of supporting brew baskets of differing sizes below a coffee bean grinder which requires minimal operator time and attention.

Apparatus for supporting a variety of different size coffee maker brew baskets according to the invention herein comprises a support plate positioned above a base, with the outlet of a coffee grinder discharging through the support plate. A pair of brew basket support arms are pivotally mounted at spaced apart points and the brew basket support arms extend horizontally below the support plate and generally flank the coffee grinder outlet. Interconnecting means are provided for establishing co-pivoting separational movement between the brew basket support arms, which are spring biased together to embrace the brew baskets received therebetween. The brew basket support arms each have a substantially straight portion extending from the pivot point and a concave facing curved portion extending to the distal end of the support arm. The distal end preferably incorporates an inwardly protruding nib. The brew basket support arms are thus shaped and adapted to receive and support brew baskets of various sizes with the lip of the supported brew basket confined between the top of the support arms and the upper support plate.

According to one aspect of the invention, the brew baskets support arms have a T-shaped cross section, with the top of the T being deployed generally vertically for receiving the side wall of a brew basket with the lip of the brew basket overlying the edge of the T. According to another aspect of the invention, the co-pivoting separational movement is achieved by integral extensions of the bucket arms having intermeshing sector gears, and the brew basket support arms are biased together by a coil spring extending therebetween near the pivot points.

Other and more specific objects and features of the invention herein will in part be apparent and will in part appear to those skilled in the art from the following description of the preferred embodiment and the claims, taken together with the drawings.

DRAWINGS

The same reference numerals refer to the same elements throughout the various figures.

DESCRIPTION OF PREFERRED EMBODIMENT

Figure 1:
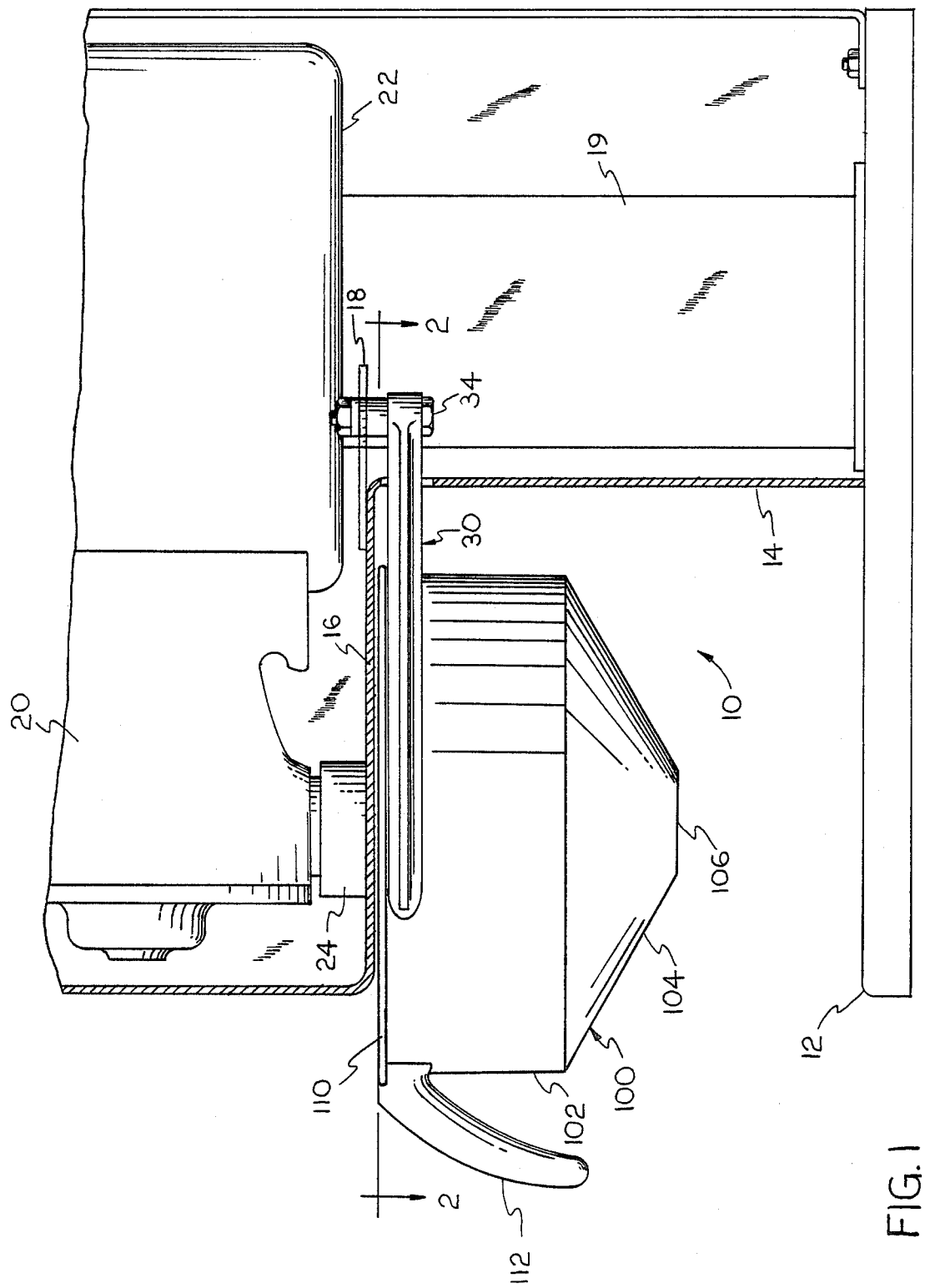
FIG. 1 is a side elevation view of coffee maker brew basket support apparatus according to the invention herein holding and supporting a brew basket below a coffee grinder.
Figure 2:
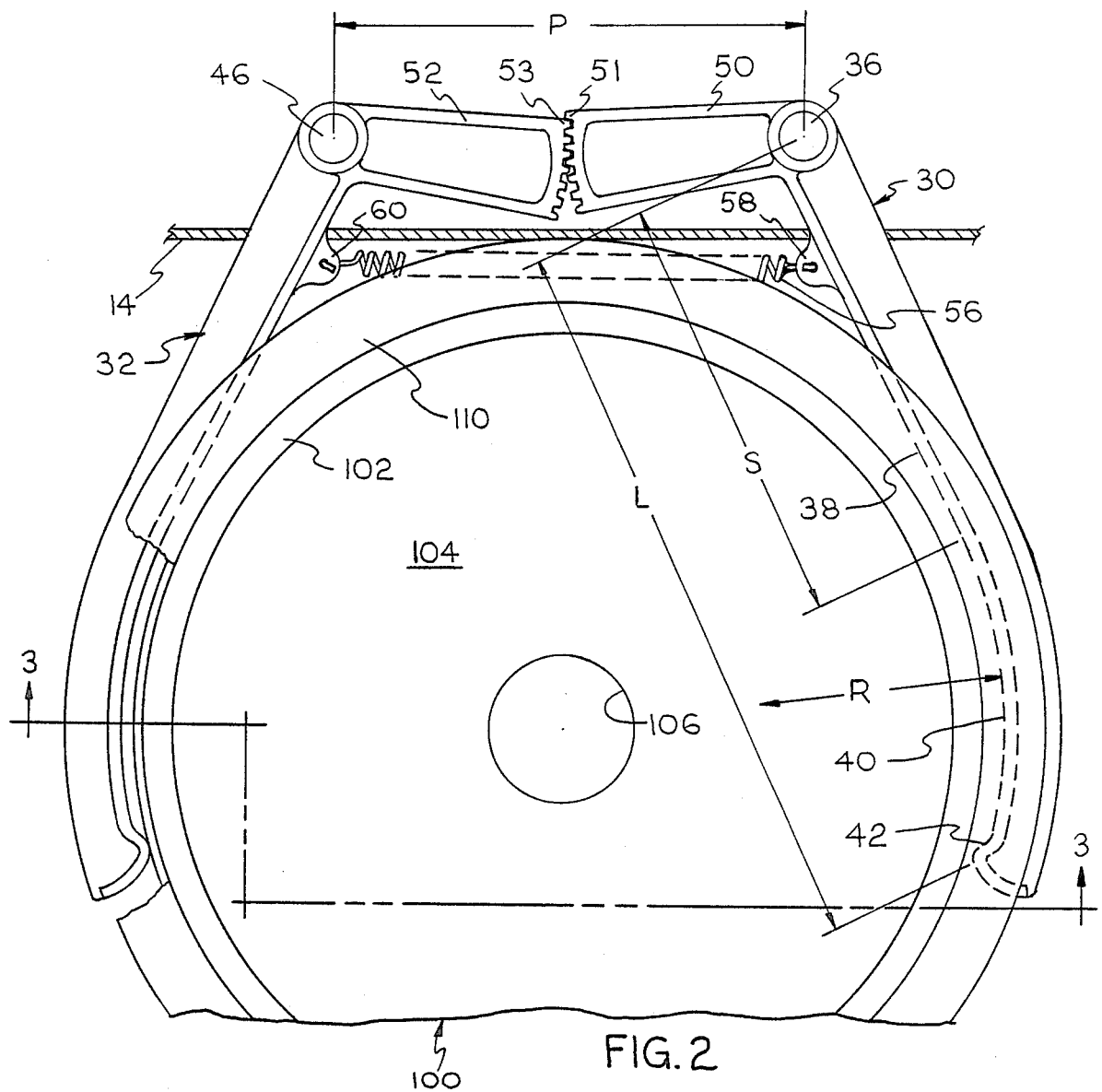
FIG. 2 is a sectional view showing or taken along the lines 2—2 of FIG. 1 showing the brew basket support arms of the brew basket support apparatus of FIG. 1.

With reference to the various figures, there is shown a support apparatus 10 for coffee maker brew baskets of various sizes, such as the coffee maker brew basket 100 illustrated in FIGS. 1 and 2. The brew basket 100 typifies the various coffee maker brew baskets in commercial use today in general configuration although many of the other coffee maker brew baskets are of different size. More particularly, the coffee maker brew basket 100 comprises a generally cylindrical, slightly tapered side wall 102 and a cone shaped converging bottom wall 104 having a discharge opening 106, together forming the open topped body of the brew basket. A lip 110 extends radially outwardly from the upper periphery of the generally cylindrical side wall 102, the lip 110 providing a peripheral support surface for the brew basket 100. A handle 112 is secured to the side wall 102 for handling and positioning the brew basket 100. The brew basket 100 is of the type receiving a filter (not shown) into which ground coffee is deposited and accordingly, has the bottom discharge opening 106, as indicated. However, it will be appreciated that the brew baskets may differ somewhat in the outlet portion, that the side wall 102 may be more or less tapered or that the side wall 102 and bottom wall 104 may together comprise a concave cup-like structure while still presenting essentially the same support aspect; namely, a peripheral lip and a generally cylindrical side wall adjacent thereto.

With reference to FIG. 1, the brew basket support apparatus 10 generally comprises a base 12 and an upstanding stop wall 14 extending to a horizontal support plate 16 spaced apart from the base 12. The support plate 16 is spaced sufficient distance above base 12 to accommodate the vertical dimension of the various coffee maker brew baskets and a height of approximately eight to ten inches is sufficient for this purpose. A mounting plate 18 is secured extending from the support plate 16. A support post 19 may further support a coffee grinder 20 driven by a motor 22 and having a discharge spout 24 for discharging ground coffee through the support plate 16.

A pair of brew basket arms 30 and 32 are pivotally mounted to the mounting plate 18 at spaced apart points thereon. The brew basket support arm 30 is pivotally mounted to the mounting plates 18 by means of a nut, bolt and bearing assembly 34, providing a pivot point at 36. The second brew basket support arm 32 is similarly mounted to the mounting plate 18, having a mounting pivot point 46 separated from the pivot point 36 by a distance P.

Figure 3:
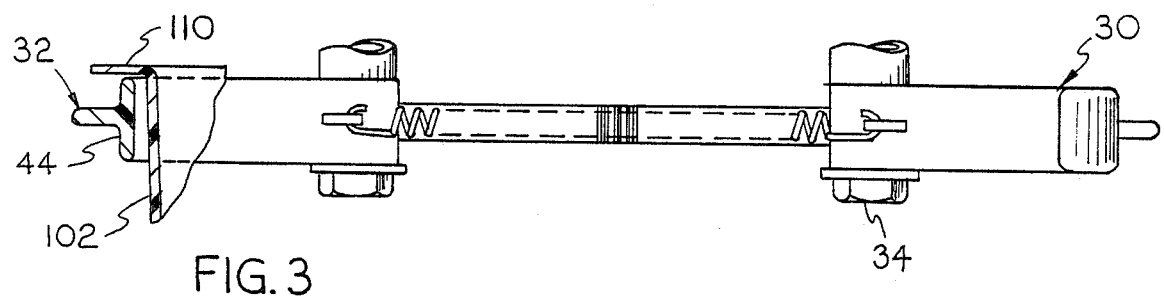
FIG. 3 is a front elevation view, partially in section along the lines 3—3 of FIG. 2 and partially cut away, of the brew basket support apparatus of FIG. 1.

The brew basket support arm 30 comprises a straight portion 38 extending a distance S from the pivot point 36 and a curved portion 40 extending from the straight portion to the distal end of the brew basket support arm 30, on which an inwardly protruding nib 4 is provided. The curved portion 40 has a radius of curvature R, with the concave side of the curve facing the other brew basket support arm 32. The brew basket support arm 30 has an overall length L. With reference to FIG. 3, the brew basket support arms 30 and 32 have a T-shaped cross section with the head 44 of the T being deployed generally vertically to receive the upper cylindrical side wall 102 of the brew basket 100, with the lip 110 overlying the brew basket support arms. The shape and size of the brew basket support arms 30 and 32 is the same, except that they are mirror images of each other.

The brew basket support arms are interconnected to establish co-pivoting separational movement by means of respective legs 50 and 52 having interlocking sector gears 51 and 53. The brew basket support arms are spring biased together by a coil spring 56 extending between eyes 58 and 60 of the brew basket support arms 30 and 32, respectively.

Figure 4:
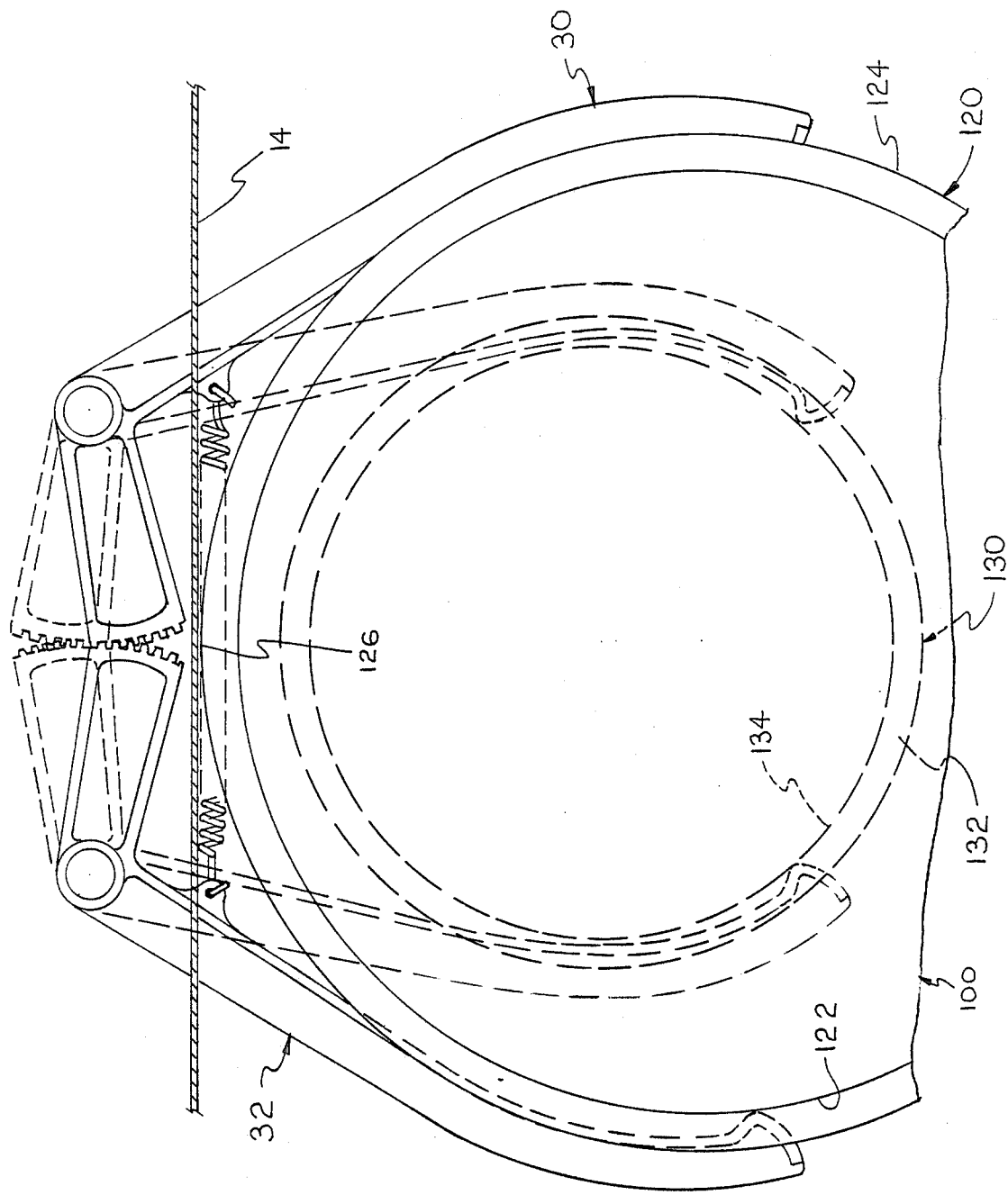
FIG. 4 is a sectional view of the brew basket support apparatus of FIG. 1, similar to the view of FIG. 2, showing the support arms adjustably receiving various size brew baskets.

With particular reference to FIGS. 2 and 4, the brew basket support arms are adapted to receive and hold coffee maker brew baskets of various diameters. On relatively large diameter brew baskets, such as brew basket 120 illustrated in FIG. 4, only the nibs at the distal ends of the support arms contact the side wall 12 and only the outer portion the peripheral lip 124 is received on the support arm, mainly on the curved portion thereof. The peripheral lip 124 contacts the stop wall 14 at 126, setting the position of the brew basket 120 with respect to the support arms 30, 32 and the grinder outlet 17 (not shown but similar to the grinder outlet 24 of FIG. 1). The peripheral lip 124 is not only supported on the support arms 30, 32, but is also confined between the support arms 30, 32 and the support plate 16, as best illustrated in FIG. 1, which stabilizes the brew basket against tipping or being "squeezed" upwardly out of the support arms in the event that the brew basket is of the type having a more tapered side wall.

The brew basket 100 shown in FIG. 2 is of medium diameter; however, its side wall 102 is also contacted by the inwardly protruding nibs at the ends of the support arms when the peripheral lip is seated against stop wall 14. The peripheral lip 102 overlays a substantial portion of the support arms and is confined between the support arms and the support plate 16. With further reference to FIG. 4, a small diameter brew basket 130 is shown held by the support arms, all in dotted lines. The curved portions of the support arms embrace the side wall 134 of brew basket 130 and the nibs may just engage the side wall or may just clear the side wall, depending on the precise size and position of the brew basket. The peripheral lip 132 of brew basket 130 is confined between the support arms and the support plate, but does not engage the stop wall 14. If the small brew basket is inserted too far, the action of the spring biased support arms will cause the brew basket to nestle between the curved portions of the support arms where it is held under tee grinder outlet spout 124.

All sizes of brew baskets are easily mounted to the brew basket support apparatus 10 by merely engaging the peripheral lip on the underside of the support plate 16 and pushing the brew basket between the support arms. The spring bias of the support arms allows them to spread easily, with the nibs passing about the largest dimension of the brew basket, whereafter they close onto and hold the brew basket as described above and illustrated in the drawings.

With particular reference to FIG. 2, it has been found that the following dimensions of the brew basket support apparatus achieve the desired objective of supporting most, if not all, commercially available coffee maker brew baskets. In the preferred embodiment shown, the separation P between the pivot points 36 and 46 is approximately $4\frac{1}{4}$ inches, the length of S of the straight portion 38 of the brew basket support arm is approximately inches and the radius of curvature R of the curved portion 40 is approximately $3\frac{1}{4}$ inches. The overall length L of the arm is approximately $6\frac{3}{8}$ inches and the nib 42 protrudes approximately $\frac{1}{8}$ of an inch inward from the radius of curvature R.

The preferred embodiment described above and the foregoing dimensions admirably achieve the objectives of the invention. It will be appreciated, however, that the preferred embodiment is illustrative only, and that various changes may be made without departing from the spirit and scope of the invention, and in particular that there is a range of dimensions which will accomplish the objectives of the invention or substantially all of them. Accordingly, the scope of the invention is defined by the following claims:

I claim:
1. Support apparatus for coffee maker brew baskets of the type having an upper generally cylindrical side wall and a lip extending radially outwardly therefrom, the support apparatus comprising:

(A) a base and a support plate spaced apart thereabove, said support plate having an opening through which the output of a coffee grinder discharges;

(B) a pair of brew basket support arms pivotally mounted at spaced apart points to extend horizontally outwardly subadjacent the support plate, the support arms having associated interconnecting means establishing co-pivoting separational movement therebetween and further having associated means biasing the support arms together, said support arms flanking the coffee grinder outlet; and (C) said brew basket support arms each having a substantially straight portion extending from its pivot point and a concave facing curved portion extending to the distal end of the brew basket support arm, wherein the support arms are shaped to receive and hold brew baskets of various sizes with the lip of the supported brew basket confined between the support arms and the support plate.

2. Brew basket support apparatus as defined in claim 1 wherein the distal ends of each of the brew basket support arms comprises an inwardly protruding nib.

3. Brew basket support apparatus as defined in claim 2 and further comprising an upstanding stop wall deployed near the pivotally mounted ends of the support arms, the stop wall engaging and positioning brew baskets received between the support arms.

4. Brew basket support apparatus as defined in claim 3 wherein the means establishing co-pivoting separational movement between the brew basket support arms comprises legs integral with each of the brew basket support arms, the legs having intermeshing sector gears on the end surfaces thereof.

5. Brew basket support apparatus as defined in claim 4 wherein the means biasing the brew basket support arms together comprise a coil spring having its ends respectively secured to each of the brew basket support arms adjacent the pivot points.

6. Brew basket support apparatus as defined in claim 5 wherein the pivot points of the brew basket support arms are separated by a distance in the range of 4 to 4½ inches, the straight portions of the brew basket support arms have a length in the range of 4–5 inches, the overall length of the brew basket support arms including the curved portion is in the range of 5 to 7 inches, the radius of curvature of the curve portion of the brew basket support arms is in the range of 3 to 4 inches.

7. A brew basket support apparatus as defined in claim 6 wherein the nib protrudes inwardly from the radius of curvature of the curved portion by distance in the range of 1/16 to 3/16 inch.

8. Brew basket support apparatus as defined in claim 5 wherein the brew basket support arms have a T-shaped cross sectional configuration with the head of the T being deployed generally vertically for embracing the generally cylindrical side wall of some sizes of brew baskets adjacent the radially outwardly extending flange thereof.

9. Brew basket support apparatus as defined in claim 2 wherein the pivot points of the brew basket support arms are separated by a distance in the range of 4 to 4½ inches, the straight portions of the brew basket support arms have a length in the range of 4–5 inches, the overall length of the brew basket support arms including the curved portion is in the range of 5 to 7 inches, the radius of curvature of the curve portion of the brew basket support arms is in the range of 3 to 4 inches.

10. Brew basket support apparatus as defined in claim 1 and further comprising an upstanding stop wall deployed near the pivotally mounted ends of the support arms, the stop wall engaging and positioning brew baskets received between the support arms.

11. Brew basket support apparatus as defined in claim 1 wherein the means establishing co-pivoting separational movement between the brew basket support arms comprises legs integral with each of the brew basket support arms, the legs having intermeshing sector gears on the end surfaces thereof.

12. Brew basket support apparatus as defined in claim 1 wherein the means biasing the brew basket support arms together comprise a coil spring having its ends respectively secured to each of the brew basket support arms adjacent the pivot points.

13. Brew basket support apparatus as defined in claim 12 wherein the brew basket support arms have a T-shaped cross sectional configuration with the head of the T being deployed generally vertically for embracing the generally cylindrical side wall of some sizes of brew baskets adjacent the radially outwardly extending flange thereof.

14. Brew basket support apparatus as defined in claim 1 wherein the pivot points of the brew basket support arms are separated by a distance in the range of 4 to 4½ inches, the straight portions of the brew basket support arms have a length in the range of 4–5 inches, the overall length of the brew basket support arms including the curved portion is in the range of 5 to 7 inches, the radius of curvature of the curve portion of the brew basket support arms is in the range of 3 to 4 inches.

15. A brew basket support apparatus as defined in claim 14 wherein the nib protrudes inwardly from the radius of curvature of the curved portion by distance in the range of 1/16 to 3/16 inch.

* * * * *